(12) United States Patent
Asami et al.

(10) Patent No.: US 10,073,173 B2
(45) Date of Patent: Sep. 11, 2018

(54) SYNTHETIC APERTURE RADAR SIGNAL PROCESSING DEVICE AND SYNTHETIC APERTURE RADAR SIGNAL PROCESSING PROGRAM

(71) Applicant: Mitsubishi Electric Corporation, Tokyo (JP)

(72) Inventors: Hiroai Asami, Tokyo (JP); Atsuo Ozaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/525,666

(22) PCT Filed: Dec. 15, 2014

(86) PCT No.: PCT/JP2014/083149
§ 371 (c)(1),
(2) Date: May 10, 2017

(87) PCT Pub. No.: WO2016/098162
PCT Pub. Date: Jun. 23, 2016

(65) Prior Publication Data
US 2017/0322302 A1    Nov. 9, 2017

(51) Int. Cl.
*G01S 13/90*    (2006.01)
(52) U.S. Cl.
CPC .................... *G01S 13/90* (2013.01)
(58) Field of Classification Search
CPC ........................ G01S 13/90–13/9094
See application file for complete search history.

(56) References Cited

U.S. PATENT DOCUMENTS 5,969,662 A    10/1999  Hellsten
7,728,756 B2*   6/2010  Krikorian ........... G01S 13/9035
                                                342/25 A
9,523,766 B2*  12/2016  Turbide ................ G01S 7/497

FOREIGN PATENT DOCUMENTS

JP    S61-073080 A    4/1986
JP    2005-083814 A   3/2005
(Continued)

OTHER PUBLICATIONS

International Search Report issued in PCT/JP2014/083149; dated Feb. 24, 2015.
(Continued)

*Primary Examiner* — Matthew M Barker
(74) *Attorney, Agent, or Firm* — Studebaker & Brackett PC

(57) ABSTRACT

There are provided: a high-accuracy factor calculator for calculating, by a high-accuracy computation method, a distance R from a moving platform to a pixel position (a, b) within an observation target corresponding to a predicted position ($x_t$, $y_t$) and a phase factor A when a determination processor determines that an error is out of an allowable range; and a low-accuracy factor calculator for calculating, by a computation method with lower accuracy than that of the high-accuracy factor calculator (e.g., a computation method using an approximation algorithm), a distance R' from the moving platform to the pixel position (a, b) corresponding to the predicted position ($x_t$, $y_t$) within the observation target and a phase factor A' when the determination processor determines that the error is within the allowable range.

6 Claims, 4 Drawing Sheets

(56) References Cited

FOREIGN PATENT DOCUMENTS

| | | |
|---|---|---|
| JP | 2006-234478 A | 9/2006 |
| JP | 3878213 B2 | 2/2007 |
| JP | 2009-128019 A | 6/2009 |
| JP | 4954032 B2 | 6/2012 |
| WO | 1997/011387 A1 | 3/1997 |

OTHER PUBLICATIONS

Jongsoo Park et al.; "Efficient Backprojection-based Synthetic Aperture Radar Computation with Many-core Processors"; The International Conference for High Performance Computing, Networking, Storage, and Analysis (SC); Nov. 10-16, 2012; pp. 1-11; IEEE; Salt Lake City, USA.

An Office Action; "Notification of Reasons for Refusal", mailed by the Japanese Patent Office dated Sep. 12, 2017, which corresponds to Japanese Patent Application No. 2016-564476 and is related to U.S. Appl. No. 15/525,666; with English language translation.

\* cited by examiner

SYNTHETIC APERTURE RADAR SIGNAL PROCESSING DEVICE AND SYNTHETIC APERTURE RADAR SIGNAL PROCESSING PROGRAM

TECHNICAL FIELD

The present invention relates to a synthetic aperture radar signal processing device which is mounted on a moving platform, such as an aircraft, an artificial satellite, etc., to reconstruct a synthetic aperture radar (SAR) image being a high-resolution image of the surface of the Earth, a sea surface, etc., and also relates to a synthetic aperture radar signal processing program.

BACKGROUND ART

A synthetic aperture radar signal processing device which is mounted on a moving platform such as an aircraft or an artificial satellite includes a SAR sensor having an antenna. While repeatedly radiating electromagnetic waves during movement of the moving platform, the SAR sensor receives reflected echoes of the electromagnetic waves reflected by a target. The synthetic aperture radar signal processing device acquires a two-dimensional SAR image by performing signal processing on the received signal of the SAR sensor.

A process of acquiring a two-dimensional SAR image from a received signal of the SAR sensor is called an image reconstruction process. A processing method for the image reconstruction process is called an image reconstruction algorithm.

As the image reconstruction algorithm, for example, there is a backprojection algorithm disclosed in the following Patent Literature 1.

The backprojection algorithm is a method of acquiring a SAR image by calculating, for each pixel composing an image, a distance between the pixel and a moving platform, and extracting and integrating signals corresponding to the distance.

Hence, the backprojection algorithm has large computational load and requires a great amount of time for computations, in comparison with an image reconstruction algorithm (e.g., a range-Doppler algorithm or a polar format algorithm) where the amount of computation is reduced by collectively processing pixels composing an image.

The following Patent Literature 2 proposes a method of reducing computation time by performing received signal processing, a pulse compression process, and an image reconstruction process of a SAR sensor in a manner of a continuous work. In this method, however, since the amount of computation itself is not reduced, the number of computing machines to be used, etc., cannot be reduced.

In addition, since the method is premised on that the processes are performed in the continuous work manner after receiving a signal, it is difficult to apply a received signal observed in the past to an image reconstruction process using the backprojection algorithm.

A method disclosed in the following Non-Patent Literature 1 is a method of reducing the amount of computation of an image reconstruction process by performing an approximation calculation to obtain individual phase factors (i.e., phase factors for compensating for an error) which are used for the backprojection algorithm. In this method, a received signal observed in the past is able to be formed into an image using the backprojection algorithm.

CITATION LIST

Patent Literature 1: WO 1997/011387 A
Patent Literature 2: JP 2009-128019 A

Non-Patent Literature 1: Jongsoo Park, Ping Tak Peter Tang, Mikhail Smelyanskiy, Daehyun Kim, Thomas Benson, "Efficient Backprojection-based Synthetic Aperture Radar Computation with Many-core Processors", The International Conference for High Performance Computing, Networking, Storage, and Analysis (SC), 2012.

SUMMARY OF INVENTION

The conventional synthetic aperture radar signal processing devices are configured in the above-described manner. Accordingly, if using a method in which individual phase factors used for the backprojection algorithm are obtained by an approximation calculation, the amount of computation of an image reconstruction process can be reduced, and a received signal observed in the past can be formed into an image using the backprojection algorithm. However, in this method, since phase factors are calculated by approximations, there may be a problem of degradation in the computational accuracy of an image reconstruction process.

The invention is made to solve problems such as that described above, and an object of the invention is to obtain a synthetic aperture radar signal processing device and a synthetic aperture radar signal processing program that are capable of reducing the amount of computation while ensuring sufficient computational accuracy of an image reconstruction process.

A synthetic aperture radar signal processing device according to the invention is provided with: a determinator (6) to determine whether an error between an predicted position of a moving platform at an observation time of a synthetic aperture radar (1) and a position of the moving platform at the observation time is within an allowable range, the synthetic aperture radar (1) having been mounted on the moving platform, the position of the moving platform being indicated in measurement data of a motion sensor (4) which measures motion of the moving platform; a first calculator (7) to calculate, when the determinator (6) determines that the error is out of the allowable range, a distance from the moving platform to a pixel position in an observation target and a phase factor used for compensating for the error, the pixel position corresponding to the predicted position, said calculation being performed by using the predicted position at the observation time and the measurement data; a second calculator (8) to calculate, when the determinator (6) determines that the error is within the allowable range, a distance to the pixel position and a phase factor used for compensating for the error by means of a computation method with lower accuracy than that of the first calculator (7), said calculation being performed by using the predicted position at the observation time and the measurement data; and an image reconstructor (10) to reconstruct a synthetic aperture radar image by performing a backprojection process that uses the distance and the phase factor calculated by the first calculator (7) or the second calculator (8) and also uses observation data of the synthetic aperture radar (1) obtained at the observation time.

According to the invention, it is configured such that there are provided: a first calculator (7) to calculate, when the determinator (6) determines that the error is out of the allowable range, a distance from the moving platform to a pixel position in an observation target and a phase factor used for compensating for the error, the pixel position corresponding to the predicted position, said calculation being performed by using the predicted position at the observation time and the measurement data; a second calculator (8) to calculate, when the determinator (6) determines that the error is within the allowable range, a distance to the pixel position and a phase factor used for compensating for the error by means of a computation method with lower accuracy than that of the first calculator (7), said calculation being performed by using the predicted position at the observation time and the measurement data; and an image reconstructor (10) to reconstruct a synthetic aperture radar image by performing a backprojection process that uses the distance and the phase factor calculated by the first calculator (7) or the second calculator (8) and also uses observation data of the synthetic aperture radar (1) obtained at the observation time. Therefore, there is an advantageous effect of being able to reduce the amount of computation while ensuring sufficient computational accuracy of an image reconstruction process.

DESCRIPTION OF EMBODIMENTS

To describe the invention in more details, modes for carrying out the invention will be described below with reference to the accompanying drawings.
(Embodiment 1)

Figure 1:
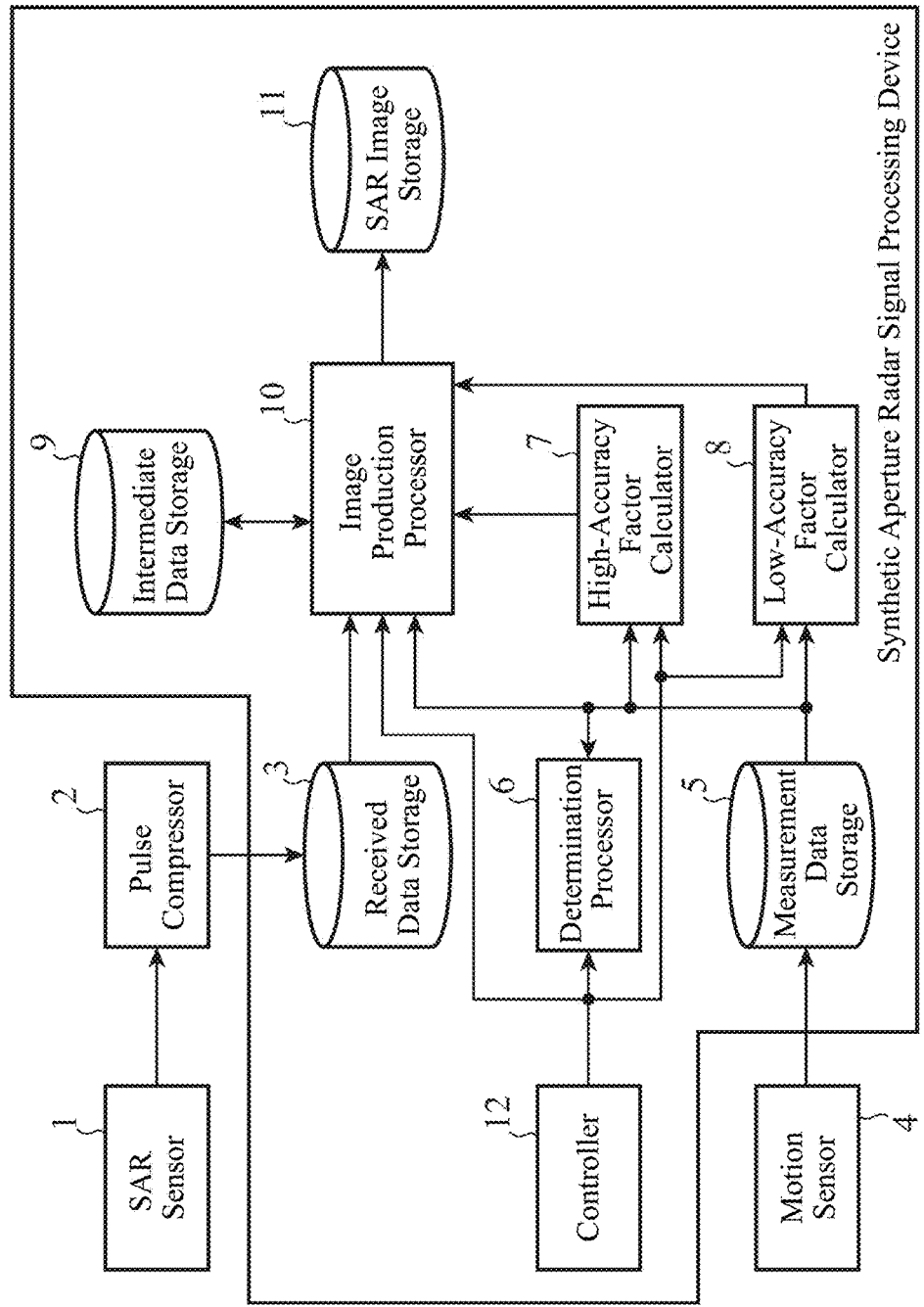
FIG. 1 is a configuration diagram showing a synthetic aperture radar signal processing device of Embodiment 1 of the invention.

FIG. 1 is a configuration diagram showing a synthetic aperture radar signal processing device of Embodiment 1 of the invention.

In FIG. 1, a SAR sensor 1 is composed of, for example, an antenna, a transmitter, a receiver, and the like. The SAR sensor 1 is mounted on a moving platform, such as an aircraft or an artificial satellite.

The SAR sensor 1 as a synthetic aperture radar is a device which operates as follows. In the SAR sensor 1, a radio-frequency pulse signal generated by the transmitter is radiated into space from the antenna. On the other hand, when the antenna receives an echo signal of the radio-frequency pulse signal reflected by an observation target, the receiver amplifies the received signal and converts the frequency of the received signal into an intermediate frequency. After that, the receiver converts the frequency-converted signal into digital received data (i.e., observation data) and outputs the one.

A pulse compressor 2 is composed of, for example, a semiconductor integrated circuit having a CPU mounted thereon or a one-chip microcomputer. The pulse compressor 2 performs pulse compression on the received data output from the SAR sensor 1 in order to increase the resolution in the range and azimuth directions of the received data, and outputs pulse-compressed received data S.

A received data storage 3 is a recording medium, such as a RAM or a hard disk, which stores the pulse-compressed received data S output from the pulse compressor 2.

A motion sensor 4 is a sensor that measures motion of the moving platform (e.g., the position in latitude/longitude/height, a velocity, and acceleration of the moving platform, and a posture of the moving platform expressed by roll, pitch, and yaw).

A measurement data storage 5 is a recording medium, such as a RAM or a hard disk, which stores measurement data of the motion sensor 4.

A determination processor 6 is composed of, for example, a semiconductor integrated circuit having a CPU mounted thereon or a one-chip microcomputer. The determination processor 6 performs, under the control of a controller 12, a process of determining whether an error between an predicted position $(x_t, y_t)$ of the moving platform at an observation time t (t=0, 1, 2, 3, . . . ) of the SAR sensor 1 on the moving platform and a position $(x_t', y_t')$ of the moving platform at the observation time t indicated by the measurement data of the motion sensor 4 stored in the measurement data storage 5 is within an allowable range. Note that the determination processor 6 composes a determinator.

A high-accuracy factor calculator 7 is composed of, for example, a semiconductor integrated circuit having a CPU mounted thereon or a one-chip microcomputer. When the determination processor 6 determines that the error is out of the allowable range, the high-accuracy factor calculator 7 performs, under the control of the controller 12, a process of calculating a distance R from the moving platform to a pixel position (a, b) within the observation target corresponding to the predicted position $(x_t, y_t)$ and also calculating a phase factor A for compensating for the error, by using the predicted position $(x_t, y_t)$ at the observation time t and the measurement data of the motion sensor 4 stored in the measurement data storage 5. Note that the high-accuracy factor calculator 7 composes a first calculator.

A low-accuracy factor calculator 8 is composed of, for example, a semiconductor integrated circuit having a CPU mounted thereon or a one-chip microcomputer. When the determination processor 6 determines that the error is within the allowable range, the low-accuracy factor calculator 8 performs, under the control of the controller 12, a process of calculating a distance R' from the moving platform to the pixel position (a, b) within the observation target corresponding to the predicted position $(x_t, y_t)$ and also calculating a phase factor A' for compensating for the error, by using the predicted position $(x_t, y_t)$ at the observation time t and the measurement data of the motion sensor 4 stored in the measurement data storage 5. This process of the low-accuracy factor calculator 8 is performed by means of a computation method with lower accuracy than that of the high-accuracy factor calculator 7 (e.g., a computation method using an approximation algorithm). Note that the low-accuracy factor calculator 8 composes a second calculator.

A intermediate data storage 9 is a recording medium, such as a RAM or a hard disk, which stores, as intermediate data, a processing result of the last backprojection process performed by an image reconstruction processor 10.

The image reconstruction processor 10 is composed of, for example, a semiconductor integrated circuit having a CPU mounted thereon or a one-chip microcomputer. When the determination processor 6 determines that the error is out of the allowable range, the image reconstruction processor 10 performs, under the control of the controller 12, a process of reconstructing a synthetic aperture radar image (hereinafter, referred to as "SAR image") by performing a reconstruct-sum operation process (a backprojection process). In order to perform the reconstruct-sum operation process, the image reconstruction processor 10 reads out, from the pulse-compressed received data S for the observation time t stored in the received data storage 3, data S(R, $y_t$) of a pixel corresponding to the distance R calculated by the high-accuracy factor calculator 7. The readout data S(R, $y_t$) of the pixel is multiplied by the phase factor A calculated by the high-accuracy factor calculator 7, and a result of the multiplication is added to the intermediate data stored in the intermediate data storage 9.

On the other hand, when the determination processor 6 determines that the error is within the allowable range, the image reconstruction processor 10 performs a process of reconstructing a SAR image by performing a reconstruct-sum operation process (a backprojection process). In order to perform the reconstruct-sum operation process, the image reconstruction processor 10 reads out, from the pulse-compressed received data S for the observation time t stored in the received data storage 3, data S(R', $y_t$) of a pixel corresponding to the distance R' calculated by the low-accuracy factor calculator 8. The readout data S(R', $y_t$) of the pixel is multiplied by the phase factor A' calculated by the low-accuracy factor calculator 8, and a result of the multiplication is added to the intermediate data stored in the intermediate data storage 9. Note that the image reconstruction processor 10 composes an image reconstructor.

A SAR image storage 11 is a recording medium, such as a RAM or a hard disk, which stores the SAR image reconstructed by the image reconstruction processor 10.

The controller 12 is composed of, for example, a semiconductor integrated circuit having a CPU mounted thereon or a one-chip microcomputer. The controller 12 controls the operation of the determination processor 6, the high-accuracy factor calculator 7, the low-accuracy factor calculator 8, and the image reconstruction processor 10.

In an example of FIG. 1, it is assumed that each of the received data storage 3, the measurement data storage 5, the determination processor 6, the high-accuracy factor calculator 7, the low-accuracy factor calculator 8, the intermediate data storage 9, the image reconstruction processor 10, the SAR image storage 11, and the controller 12, which are the components of the synthetic aperture radar signal processing device, is composed of dedicated hardware. Alternatively, the synthetic aperture radar signal processing device may be composed of a computer.

Figure 7:
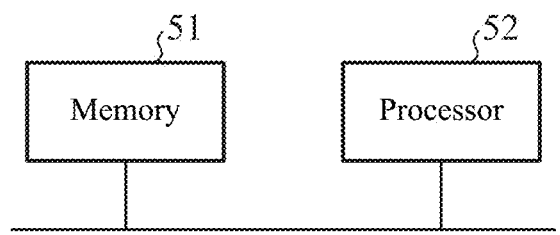
FIG. 7 is a hardware configuration diagram for a case where the synthetic aperture radar signal processing device is composed of a computer.

FIG. 7 is a hardware configuration diagram for a case where the synthetic aperture radar signal processing device is composed of a computer.

When the synthetic aperture radar signal processing device is composed of a computer, the received data storage 3, the measurement data storage 5, the intermediate data storage 9, and the SAR image storage 11 are formed in a memory 51 of the computer. Further, a synthetic aperture radar signal processing program that describes processing content of the determination processor 6, the high-accuracy factor calculator 7, the low-accuracy factor calculator 8, the image reconstruction processor 10, and the controller 12 (i.e., a determination processing step, a first calculation processing step, a second calculation processing step, and an image reconstruction processing step) is stored in a memory 51 of the computer. Then, a processor 52, such as a CPU of the computer, executes the synthetic aperture radar signal program stored in the memory 51.

Figure 2:
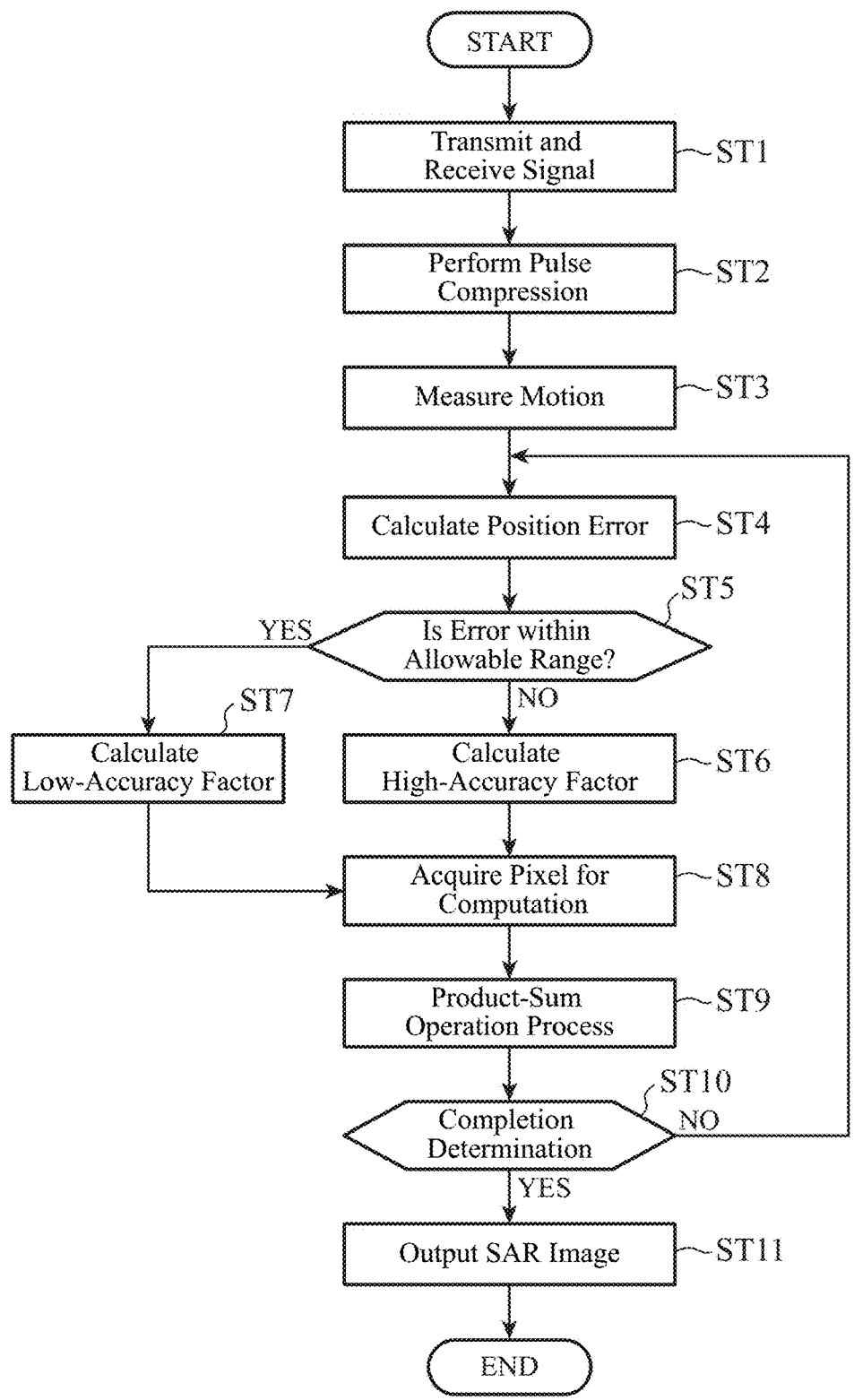
FIG. 2 is a flowchart showing the processing content of the synthetic aperture radar signal processing device of the Embodiment 1 of the invention.

FIG. 2 is a flowchart showing the processing content of the synthetic aperture radar signal processing device of the Embodiment 1 of the invention.

Next, operation will be described.

First, the SAR sensor 1 radiates a radio-frequency pulse signal generated by the transmitter into space from the antenna.

When the radio-frequency pulse signal radiated into space from the antenna is reflected by an observation target and an echo signal of the radio-frequency pulse signal is returned, the antenna of the SAR sensor 1 receives the returned echo signal.

The receiver of the SAR sensor 1 amplifies the received signal of the antenna and converts the frequency of the received signal into an intermediate frequency. After that, the receiver performs A/D conversion on the signal of the intermediate frequency and thereby outputs digital received data to the pulse compressor 2 (step ST1 of FIG. 2).

After receiving the digital received data from the SAR sensor 1, the pulse compressor 2 performs pulse compression on the received data in order to increase the resolution in the range and azimuth directions of the received data, and stores pulse-compressed received data S in the received data storage 3 (step ST2).

A pulse compression process for the received data which is performed by the pulse compressor 2 is a well-known technique and thus a detailed description thereof is omitted.

The motion sensor 4 measures the motion of the moving platform (e.g., the position in latitude/longitude/height, a velocity, and acceleration of the moving platform, and a posture of the moving platform expressed by roll, pitch, and yaw) and stores the measurement data in the measurement data storage 5 (step ST3).

A process of measuring the motion of the moving platform which is performed by the motion sensor 4 is a well-known technique and thus a detailed description thereof is omitted.

In the Embodiment 1, it is assumed that a flight plan (a flight route and a flight time) of the moving platform is given in advance. Hence, it is assumed that an observation time t (t=0, 1, 2, 3, . . . ) of the SAR sensor 1 and a predicted position ($x_t$, $y_t$, $z_t$) of the moving platform at the observation time t are preset in the controller 12.

The controller 12 notifies the determination processor 6, the high-accuracy factor calculator 7, the low-accuracy factor calculator 8, and the image reconstruction processor 10 of the preset observation time t of the SAR sensor 1 and the predicted position ($x_t$, $y_t$, $z_t$) of the moving platform at the observation time t.

Figure 3:
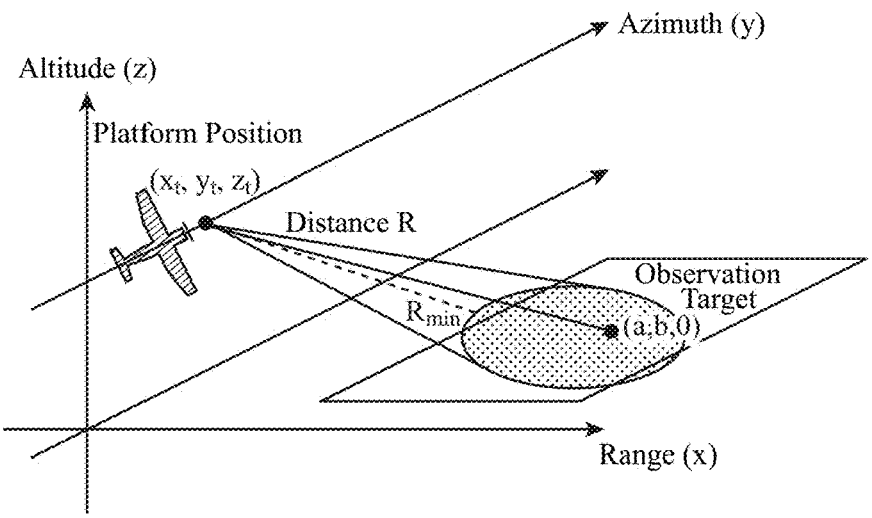
FIG. 3 is an illustrative diagram showing a relation between a moving platform and an observation target.

FIG. 3 is an illustrative diagram showing a relation between the moving platform and the observation target.

In an example of FIG. 3, the moving platform performs uniform linear motion, and the SAR sensor 1 mounted on the moving platform radiates radio-frequency pulse signals in a direction perpendicular to a traveling direction of the moving platform.

In FIG. 3, for convenience of description, the traveling direction (azimuth direction) of the moving platform corresponds to a y-axis, the radiation direction (range direction) of the radar corresponds to an x-axis, and the altitude direction of the moving platform corresponds to a z-axis. The z-axis extends in vertical upward. The observation target is spread out on a plane with z=0. In addition, the moving platform flies in a straight line represented by $x=0$ and $z=z_0$. Therefore, a variable that changes as an predicted position is only $y_t$.

At the position of the moving platform being $(x_t, y_t, z_t)$, when a radio-frequency pulse signal is radiated from the SAR sensor 1 and reflected at a position $(a, b, 0)$ within the observation target, a distance R between the position $(x_t, y_t, z_t)$ of the moving platform and the pixel position $(a, b, 0)$ within the observation target is generally expressed as shown in the following equation (1):

$$R = \sqrt{(x_t-a)^2 + (y_t-b)^2 + z_t^2} \qquad (1)$$

A radio-frequency pulse signal is radiated from the SAR sensor 1 not only once but multiple times at constant intervals. In general, a radio-frequency pulse signal is spread out in the azimuth direction. Accordingly, the position $(a, b, 0)$ within the observation target is irradiated with a plurality of radio-frequency pulse signals which are radiated at different positions from the SAR sensor 1.

A backprojection algorithm performed by the image reconstruction processor 10, which will be explained later, corresponds to an image reconstruction process in which a SAR image is reconstructed by performing a reconstruct-sum operation such as that shown in the following equation (2).

$$\mathrm{Img}(a, b) = \Sigma S(R, y_t) \exp\left(\frac{4\pi j R}{\lambda}\right) \qquad (2)$$

In the equation (2), $\lambda$ is the wavelength of the radio-frequency pulse signal, and j is the imaginary unit. S( ) is received complex data having been subjected to pulse compression by the pulse compressor 2 and is received data of an echo signal reflected by a pixel within the observation target that is present at a position with the distance R from the moving platform.

In addition, Img(a, b) is the pixel value of a pixel at a position $(a, b)$ in the SAR image, which is calculated by the image reconstruction processor 10.

The equation (2) is an integration process for a pixel at the position $(a, b, 0)$ where the equation (1) holds true. A SAR image is calculated by performing a reconstruct-sum operation of the equation (2) on all pixels within the observation target. Hence, a computation process performed by the image reconstruction processor 10 corresponds to processing of the computation of the equation (2) performed by a triple loop using a, b, and $y_t$ as elements and the distance R of the equation (1) as a constraint condition.

Figure 4:
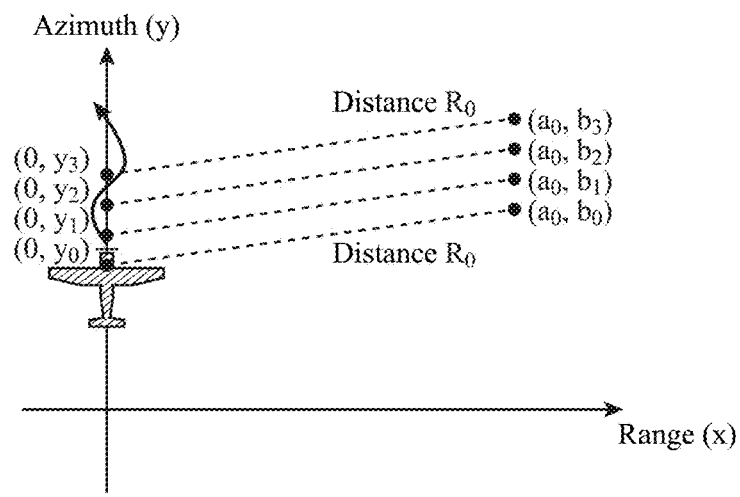
FIG. 4 is an illustrative diagram showing a relation between a predicted position of the moving platform at an observation time t and a pixel position in the observation target corresponding to the predicted position.

The equation (2) is a simple reconstruct-sum operation and thus the order of computations is not problematic. Hence, instead of integrating a given pixel by fixing a and b and changing $y_t$, it is possible to perform a computation by fixing the distance R. FIG. 4, which will be referred to later, shows a case of performing computations with the fixed distance R.

FIG. 4 is an illustrative diagram showing a relation between an predicted position $(x_t, y_t, z_t)$ of the moving platform at an observation time t and a pixel position $(a, b, 0)$ within the observation target corresponding to the predicted position $(x_t, y_t, z_t)$.

In FIG. 4, the moving platform and the observation target are viewed two-dimensionally from the z-axis direction and thus depiction of the z-axis direction is omitted. Hence, in FIG. 4, the z-coordinates of predicted positions and pixel positions are omitted.

In FIG. 4, the position at which the moving platform transmits a pulse for the first time is $(0, y_0)$, and thereafter, the moving platform transmits pulses at positions $(0, y_1)$, $(0, y_2)$, and $(0, y_3)$.

Note that, for the sake of simplification, it is set such that pulse transmission intervals are constant, a distance that the platform moves between the pulse transmission intervals is L, and intervals between pixels in the azimuth direction of an observation image are also L. Therefore, $y_0=y_1-L=y_2-2*L=y_3-3*L$ and $b_0=b_1-L=b_2-2*L=b_3-3*L$ are fulfilled.

Here, it is assumed that the initial position of the moving platform for performing the reconstruct-sum operation of the equation (2) is $(0, y_0)$, a computation-target pixel is $(a_0, b_0)$, and a distance between those two points is $R_0$. When the position of the moving platform for performing the next reconstruct-sum operation of the equation (2) is set to $(0, y_1)$, the computation-target pixel is also changed to $(a_0, b_1)$.

From the above assumption, since $y_1=y_0+L$ and $b_1=b_0+L$ are obtained, the distance between two points, namely, between the moving platform and each of the computation-target pixels is $R_0$. Likewise, when the position of the moving platform which is a target of the reconstruct-sum operation of the equation (2) is changed to $(0, y_2)$ and $(0, y_3)$, the computation-target pixels are also changed to $(a_0, b_2)$ and $(a_0, b_3)$, and thereby the distance between the two points is always constantly $R_0$.

Accordingly, by changing the computation-target pixel in parallel to change in the observation position of the platform, the distance between the two points can be made constant.

In an image reconstruction process performed by the image reconstruction processor 10, which will be described later, $(x_t, y_t)$ in FIG. 4 corresponds to an predicted position of the moving platform, and a pixel of the intermediate data stored in the intermediate data storage 9 corresponds to a pixel at a position $(a, b)$ within the observation target.

When the distance R between the predicted position $(x_t, y_t)$ of the moving platform and the pixel position $(a, b)$ within the observation target is constant, exp( ) in the equation (2) is constant and thus a factor computation can be simplified. When the pixel position $(a, b)$ reaches an upper end of an image of the observation target by sliding the distance R being constant, the pixel position $(a, b)$ is returned to a lower end of the image of the observation target, and the same process is repeated by changing the distance R.

In the Embodiment 1, since the moving platform is assumed as performing uniform linear motion, the moving platform is assumed to move on the y-axis and radiates radio-frequency pulse signals at the positions marked with "•". However, in practice, due to external factors such as wind direction, the moving platform may move to positions off the y-axis to the left and right, as indicated by a wavy line of FIG. 4.

When the determination processor 6 is notified by the controller 12 of an observation time t of the SAR sensor 1 and an predicted position $(x_t, y_t, z_t)$ of the moving platform at the observation time t, the determination processor 6 acquires measurement data that is measured at the observation time t by the motion sensor 4 from among the measurement data of the motion sensor 4 stored in the measurement data storage 5, and identifies a position $(x_t', y_t')$ of the moving platform included in the measurement data.

The position of the moving platform may be shifted to the left or right due to external factors such as wind direction. Thus, the position $(x_t', y_t')$ of the moving platform included in the measurement data and corresponding to the actual position may be shifted from the predicted position $(x_t, y_t, z_t)$ of the moving platform.

Subsequently, the determination processor 6 calculates an error between the predicted position $(x_t, y_t)$ of the moving platform at the observation time t and the position $(x_t', y_t')$ of the moving platform included in the measurement data (step ST4 of FIG. 2).

In the example shown in FIG. 4, since the moving platform is assumed as performing uniform linear motion on the y-axis, an error in the range direction $(=x_t-x_t')$ is calculated.

When the determination processor 6 has calculated the position error, the determination processor 6 determines whether the error is within an allowable range (step ST5).

Namely, if the position error is greater than a predetermined threshold value (a threshold value set in numerical format specified in advance), the determination processor 6 determines that the error is out of the allowable range. If the error is less than or equal to the threshold value, the determination processor 6 determines that the error is within the allowable range. The setting of the threshold value will be described later.

Figure 5:
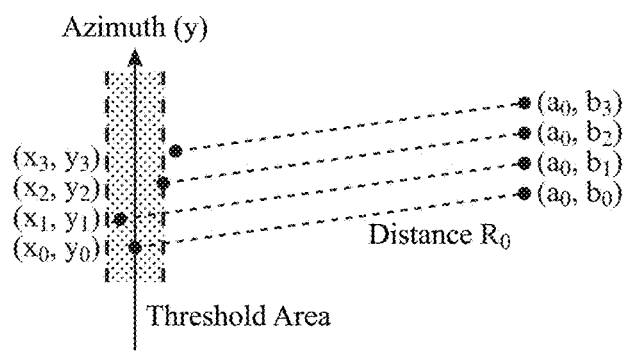
FIG. 5 is an illustrative diagram showing a relation between a position error and a threshold value.

FIG. 5 is an illustrative diagram showing a relation between the position error and the threshold value.

In the example shown in FIG. 5, when the observation times are t=1 and t=2, position errors (x1) and (x2) are small and thus are determined to be within the allowable range. However, when the observation time t=3, the position error (x3) is large and thus is determined to be out of the allowable range.

The observation time t=0 is a starting point time at which a process starts. In the example of FIG. 5, there is no position error (x0) (i.e., x0=0).

When the observation time t is the process's starting point time t=0, or when the observation time t is a time other than the process's starting point time t=0 (t=1, 2, 3, . . . ) and the determination processor 6 determines that the error is out of the allowable range (i.e., "No" in step ST5 of FIG. 2), if the amount of computation for calculating a distance R and a phase factor A is reduced, the computational accuracy of an image reconstruction process performed by the image reconstruction processor 10 may degrade. Then, the high-accuracy factor calculator 7 calculates, under the control of the controller 12, a distance R from the moving platform to a pixel position (a, b) within the observation target corresponding to the predicted position $(x_t, y_t)$ at the observation time t and a phase factor A with high accuracy, by using the predicted position $(x_t, y_t)$ and measurement data of the motion sensor 4 for the observation time t which is stored in the measurement data storage 5 (step ST6).

Here, the distance R calculated by the high-accuracy factor calculator 7 is R in the equation (1), and calculation of the R requires a square-root computation.

In addition, the phase factor A calculated by the high-accuracy factor calculator 7 is $\exp(4\pi jR/\lambda)$ in the equation (2). Since the computations of $\exp(4\pi jR/\lambda)$ are complex exponential calculations, they are, in practice, a sine and a cosine computations.

In general, when those computations are performed by digital signal processing, they are performed by using, for example, an iterative method, etc., until a value is converged to a certain value or to a value in a certain range. As a matter of course, since the digits of a numerical value corresponding to computational accuracy is finite and there is also a computational error, there is a deviation from a theoretical numerical value. However, in the digital signal processing, computations are performed until a value is converged to a close value in a range representable by the digits of a numerical value.

For specific examples of a computation method used by the high-accuracy factor calculator 7, there are considered a computation method in which the square root in the equation (1) is found by Newton's method, and also considered a computation method in which "tan" (tangent) is found by a continued fraction expansion and a result thereof is converted into the sine and the cosine represented by the equation (2). In these computations, a numerical value is calculated with a 32-bit floating point number format specified in IEEE 754. Note, however, that the above-described computation methods are merely examples, and other computation methods of the same type, such as those using an iterative method, may be used alternatively.

When the observation time t is a time other than the process's starting point time t=0 (t=1, 2, 3, . . . ) and the determination processor 6 determines that the error is within the allowable range (i.e., "Yes" in step ST5 of FIG. 2), it is determined that, even if the amount of computation for calculating a distance R and a phase factor A is reduced, sufficient computational accuracy can be obtained in an image reconstruction process performed by the image reconstruction processor 10. Thus, the low-accuracy factor calculator 8 calculates, under the control of the controller 12, a distance R' from the moving platform to a pixel position (a, b) within the observation target corresponding to the predicted position $(x_t, y_t)$ at the observation time t and a phase factor A' with low accuracy, by a computation method with lower accuracy than that of the high-accuracy factor calculator 7, using the predicted position $(x_t, y_t)$ and measurement data of the motion sensor 4 for the observation time t which is stored in the measurement data storage 5 (step ST7).

A specific example of a computation method used by the low-accuracy factor calculator 8 will be described below.

As with the high-accuracy factor calculator 7, a computation method used by the low-accuracy factor calculator 8 is a computation method in which a numerical value is calculated the 32-bit floating point number format of IEEE 754.

The low-accuracy factor calculator 8 calculates a distance R' between the moving platform and a pixel within the observation target at the observation time t, in accordance with the following equation (3). In this calculation, it is assumed that the predicted position of the moving platform at the observation time t is $(x_t, y_t, z_t)$, the actual position of the moving platform at the observation time t is $(x_t+\Delta x, y_t+\Delta y, z_t+\Delta z)$, and a pixel position in the observation target where a radio-frequency pulse signal is irradiated is (a, b, 0). In addition, a phase factor A' $(=\exp(4\pi jR'/\lambda))$ is calculated as shown in the following equation (4).

$$R' = \sqrt{(x_t + \Delta x - a)^2 + (y_t + \Delta_y - b)^2 + (z_t + \Delta z)^2} \quad (3)$$
$$\cong R + \frac{(x_t - a)\Delta x + (y_t - b)\Delta y + z_t \Delta z}{R}$$

$$\exp\left(\frac{4\pi jR'}{\lambda}\right) = \exp\left(\frac{4\pi j(R + \Delta R)}{\lambda}\right) = \exp\left(\frac{4\pi jR}{\lambda}\right)\exp\left(\frac{4\pi jR}{\lambda}\right) \quad (4)$$

where $\Delta R = R' - R$

-continued $$\exp\left(\frac{4\pi j \Delta R}{\lambda}\right) = \exp(j\alpha) = \cos(\alpha) + j \cdot \sin(\alpha) \quad (5)$$

$$\cong \left(1 - \frac{1}{2}\alpha^2\right) + j \cdot \left(\alpha - \frac{1}{6}\alpha^3\right)$$

$$\alpha = \frac{4\pi \Delta R}{\lambda}$$

The equation (3) indicates that the equation (1) is approximated by the first-order terms of $\Delta x$, $\Delta y$, and $\Delta z$, by using a Taylor expansion with multiple variables, etc. The value of R has been found upon calculating a process's starting point and the predicted position $(x_t, y_t, z_t)$ of the moving platform can be considered a constant by the coordinates of the starting point. Thus, the distance R' can be calculated only by performing a reconstruct-sum operation of $\Delta x$, $\Delta y$, and $\Delta z$.

Likewise, the equation (5) indicates that trigonometric functions are approximated by the third-order term of $\alpha$.

It depends on the magnitude of $\Delta x$, $\Delta y$, and $\Delta z$ that, how far the distance R' calculated by the equation (3) deviates from the theoretical distance R calculated by the equation (1). Depending on the setting of the threshold value, a distance can be found rapidly with sufficient accuracy and with a smaller amount of computation compared to the computation performed by the high-accuracy factor calculator 7.

If the determination processor 6 determines that the error is out of the allowable range, the image reconstruction processor 10 performs, under the control of the controller 12, a process of reading out, from the pulse-compressed received data S for the observation time t stored in the received data storage 3, data $S(R, y_t)$ of a pixel corresponding to the distance R which is calculated by the high-accuracy factor calculator 7, and also reading out Img (a, b) being intermediate data stored in the intermediate data storage 9 (step ST8).

After that, the image reconstruction processor 10 performs, in accordance with the equation (2), a reconstruct-sum operation process (backprojection process) in which the data $S(R, y_t)$ of a pixel corresponding to the distance R is multiplied by the phase factor A ($=\exp(4\pi j R/\lambda)$) which has been calculated by the high-accuracy factor calculator 7, and a result of the multiplication is added to the Img(a, b), and thereby calculates data Img(a, b) of each pixel of a SAR image (step ST9).

If the determination processor 6 determines that the error is within the allowable range, the image reconstruction processor 10 performs, under the control of the controller 12, a process of reading out, from the pulse-compressed received data S for the observation time t which is stored in the received data storage 3, data $S(R', y_t)$ of a pixel corresponding to the distance R' which is calculated by the low-accuracy factor calculator 8, and also reading out Img (a, b) which is intermediate data stored in the intermediate data storage 9 (step ST8).

After that, the image reconstruction processor 10 performs, in accordance with the equation (2), a reconstruct-sum operation process (backprojection process) in which the data $S(R', y_t)$ of a pixel corresponding to the distance R' is multiplied by the phase factor A' ($=\exp(4\pi j R'/\lambda)$) which has been calculated by the low-accuracy factor calculator 8, and a result of the multiplication is added to the Img(a, b), and thereby calculates data Img(a, b) of each pixel of a SAR image (step ST9).

Although the image reconstruction processor 10 reads out data $S(R, y_t)$ of a pixel corresponding to the distance R or data $S(R', y_t)$ of a pixel corresponding to the distance R', the image reconstruction processor 10 may alternatively perform an interpolation process on the readout data and then perform the above-described reconstruct-sum operation process (backprojection process).

That is to say, since the pulse-compressed received data S stored in the received data storage 3 is discretized at a sampling frequency used for conversion to a digital signal, it is better to interpolate pieces of received data S at a plurality of points and perform the above-described reconstruct-sum operation process (backprojection process) on the interposed received data S.

For an interpolation process for pieces of received data S at a plurality of points, there is considered, for example, a process of weighting two points on the same azimuth line by distance. In this case, the image reconstruction processor 10 reads out, at step ST8, pieces of received data at two points to be used for interpolation. Thereafter, at step ST9, the image reconstruction processor 10 calculates a value by performing the interpolation on the pieces of received data at two points, and performs a reconstruct-sum operation shown in the equation (2).

The controller 12 determines whether the processes of steps ST4 to ST9 have been completed for all pixels in the observation target (step ST10). If the processes at steps ST4 to ST9 have not yet been completed for all pixels in the observation target ("No" in step ST10), the controller 12 instructs the determination processor 6, the high-accuracy factor calculator 7, the low-accuracy factor calculator 8, and the image reconstruction processor 10 to repeat the processes at steps ST4 to ST9.

On the other hand, if the processes at steps ST4 to ST9 have been completed for all pixels in the observation target ("Yes" in step ST10), Img(a, b) being intermediate data is read out from the intermediate data storage 9 and stored in the SAR image storage 11 as data Img(a, b) of each pixel of a SAR image (step ST11).

Next, the setting of the threshold value which is used for a determination as to whether a position error is within the allowable range will be described.

The threshold value may be set by the determination processor 6, or may be set by the controller 12 and given to the determination processor 6.

As described above, the above-described the equation (3) indicates that the equation (1) is approximated by the first-order terms of $\Delta x$, $\Delta y$, and $\Delta z$ by using the Taylor expansion with multiple variables, etc.

In contrast, the following equation (6) indicates that the equation (1) is approximated by the second-order terms of $\Delta x$, $\Delta y$, and $\Delta z$ by using the Taylor expansion with multiple variables, etc.

Here, assuming that a numerical value is represented in an IEEE 754 32-bit floating point number format, since the first term in the equation (6) is R, if a condition of the following equation (7) holds true, the second-order term of $\Delta x$ is less than or equal to $½^{24}$ of R. Thus, the numerical value cannot be represented in a range of a 23-bit mantissa, resulting in a computational error.

Such the condition is also the same for other second-order terms. When the following equation (8) derived from the equation (7) holds true, the second-order terms in the equation (6) can be ignored within a range of computational error, and the approximation by the equation (3) can be performed.

Therefore, a threshold value (R/4096) shown in the equation (8) may be set for $\Delta x$, $\Delta y$, and $\Delta z$.

$$R' = \sqrt{(x_t\Delta x - a)^2 + (y_t + \Delta y - b)^2 + (z_t + \Delta z)^2} \quad (6)$$

$$\cong R + \frac{(x_t - a)\Delta x + (y_t - b)\Delta y + z_t\Delta z}{R} +$$

$$\frac{1}{2}\left(\frac{\Delta x^2 + \Delta y^2 + \Delta z^2}{R}\right) -$$

$$\frac{1}{2}\left(\frac{(x_t-a)^2\Delta x^2 + (y_t-b)\Delta y^2 + z_t^2\Delta z^2 + (x_t-a)}{R^3}\right)$$

$$\frac{\Delta x^2}{R^2} < 2^{-24} \quad (7)$$

$$\Delta x < R \cdot 2^{-12} = \frac{R}{4096} \quad (8)$$

The setting of a threshold value where the above-described the equation (5) holds true has the same idea as that described above.

In order that a term of a to the fourth power can be ignored within a range of computational error, a condition such as shown in the following equation (9) may be set. Hence, the setting of a threshold value is as shown in the following equation (10).

The condition for the determination at step ST5 may be the one where both the equations (8) and (10) hold true.

$$\alpha^4 = \left(\frac{4\pi\Delta R}{\lambda}\right)^4 < 2^{-24} \quad (9)$$

$$\Delta R < \frac{\lambda}{4\pi}2^{-6} = \frac{\lambda}{256\pi} \quad (10)$$

In the above-described equation (8), the threshold value is set by using a distance R which has been calculated at a starting point. Alternatively, the threshold value may be set by using a distance $R_{min}$ (see FIG. 3) from an observation point that is closest from the moving platform.

In the embodiment above, the threshold is set to satisfy the both conditions hold true. That is, it is required that the equation (8) using a distance R calculated at a starting point as a threshold value condition and the equation (10) using a wavelength $\lambda$ of a radio-frequency pulse signal as a threshold value condition hold true. Alternatively, the conditions may be set individually. For example, when the equation (8) holds true while the equation (10) does not hold true, the low-accuracy factor calculator 8 may calculate a distance R' and the high-accuracy factor calculator 7 may calculate a phase factor A.

In addition, although in the above-described example one threshold value is set, a plurality of threshold values may be set in a stepwise manner.

For example, although the equation (10) has a threshold value condition for a case where a term of a to the fourth power can be ignored, if the equation (10) does not hold true, then a threshold value where a term of a to the sixth power can be ignored may be set, and the low-accuracy factor calculator 8 may perform an approximation by a term of $\alpha$ to the fourth power.

Although in the above-described example, the same threshold value is set for all of $\Delta x$, $\Delta y$, and $\Delta z$, threshold values may be set individually depending on an environmental condition, etc.

Specifically, on a basis of information such as the shape of the moving platform or wind direction having been observed in advance, a threshold value or a process for any of $\Delta x$, $\Delta y$, and $\Delta z$ may be ignored.

For example, there is a case where it is known in advance from wind direction etc., that a change in $\Delta x$ is large while a change in $\Delta y$ is sufficiently small relative to the threshold value. In this case, a threshold value condition for $\Delta y$ may be ignored and processing may be performed with $\Delta y=0$ in the computation of the equation (3).

In the above-described example, although the 32-bit floating point number format of IEEE 754 is used for calculating a numerical value and for setting a threshold value, this format is simply one example. The threshold value may be set using other formats and a numerical value may be calculated using other formats.

As is clear from the above, according to the Embodiment 1, it is configured such that there are provided: the high-accuracy factor calculator 7 that calculates, when the determination processor 6 determines that an error is out of an allowable range, a distance R from a moving platform to a pixel position (a, b) within an observation target corresponding to an predicted position ($x_t$, $y_t$) at an observation time t, and a phase factor A, by using the predicted position ($x_t$, $y_t$) and measurement data of the motion sensor 4 stored in the measurement data storage 5; and the low-accuracy factor calculator 8 that calculates, when the determination processor 6 determines that the error is within the allowable range, a distance R' from the moving platform to the pixel position (a, b) corresponding to the predicted position ($x_t$, $y_t$) at the observation time t within the observation target, and a phase factor A', by a computation method with lower accuracy than that of the high-accuracy factor calculator 7 (e.g., a computation method using an approximation algorithm), by using the predicted position ($x_t$, $y_t$) and the measurement data of the motion sensor 4 stored in the measurement data storage 5, and the image reconstruction processor 10 reconstructs a SAR image by performing a backprojection process that uses the distance and phase factor calculated by the high-accuracy factor calculator 7 or the low-accuracy factor calculator 8, and pulse-compressed received data S for the observation time t. Therefore, an advantageous effect of being able to reduce the amount of computation while ensuring sufficient computational accuracy of an image reconstruction process can be provided.

As a result, it is possible to achieve a reduction in the size, weight, and cost, etc., of a synthetic aperture radar signal processing device.

(Embodiment 2)

In the above-described Embodiment 1, it is assumed that the moving platform performs the uniform linear motion, and only a single starting point is set for a process. Alternatively, when the moving platform performs a motion other than the uniform linear motion, such as a curve motion, the curve may be approximated by a plurality of straight lines, and beginning points of the plurality of straight lines may be respectively set at positions of starting points of the process.

Figure 6:
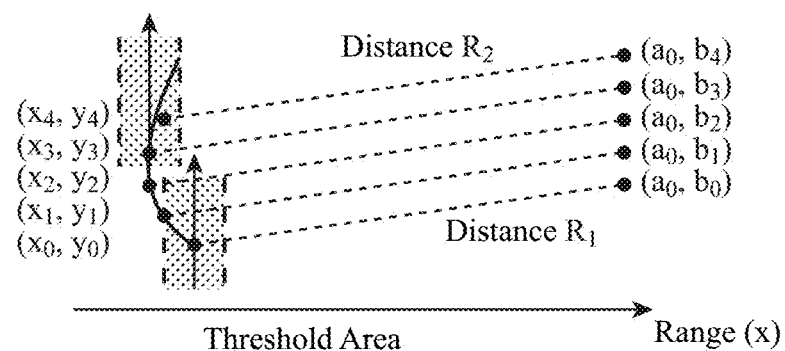
FIG. 6 is an illustrative diagram showing a relation between a position error and a threshold value for a case where a movement of the moving platform forms a curve.

FIG. 6 is an illustrative diagram showing a relation between a position error and a threshold value for a case where a movement of the moving platform forms a curve.

Basic processing content of a synthetic aperture radar signal processing device is the same as that of the above-described Embodiment 1. On the other hand, in the Embodiment 2, beginning points of a plurality of straight lines by which a curve is approximated are respectively set at the positions of starting points at which a process starts. Thus, there are more cases of a high-accuracy factor calculator 7 calculating a distance R and a phase factor A than in the Embodiment 1.

In the example of FIG. 6, for the positions from $y_0$ to $y_2$ in an azimuth direction of the moving platform, a threshold value is set on the assumption that a position $(0, y_0)$ is a starting point.

In addition, when the moving platform moves to a position $(x_3, y_3)$, a threshold value is set with this position $(x_3, y_3)$ as a new starting point, and the high-accuracy factor calculator 7 calculates a distance $R_2$ from the position $(x_3, y_3)$ to a target.

As described above, even when a movement of the moving platform forms a curve, by resetting a starting point every n point, a process can be performed by the same technique as that for a case of the uniform linear motion. Therefore, the same advantageous effect as that of the Embodiment 1 can be obtained.

An interval for resetting a starting point may be set such that the starting point is reset when an assumed trajectory of the moving platform goes beyond a threshold area.

In addition, in FIG. 6, a pixel within an observation target as a processing target is set to slide with respect to the moving platform. However, in a case of transmitting a radio-frequency pulse signal to a specific region from the moving platform like spotlight mode, the case can be dealt with by the same process. In also such case, a threshold value determination as to the degree of deviation from a starting point distance may be made, and the high-accuracy factor calculator 7 or the low-accuracy factor calculator 8 may calculate a distance and a phase factor according to a result of the determination.

(Embodiment 3)

In the above-described Embodiment 1, the determination processor 6 determines that a position error is out of an allowable range when the error is greater than a preset threshold value, and determines that the error is within the allowable range when the error is less than or equal to the threshold value. However, when ΔR as a distance deviation is on the same order as the wavelength λ of a pulse signal or when ΔR is greater than the wavelength λ of a pulse signal, the threshold value condition of the equation (10) may not hold true. Each α in the equation (5) indicates the phase of a sine or a cosine. When α=2π, the phases complete one cycle and thus a sine and a cosine have the same values as those for α=0. Therefore, when ΔR is on the same order as the wavelength λ or when ΔR is greater than the wavelength λ, the threshold value condition of the equation (10) may not hold true.

In view of above, in the Embodiment 3, in order that a determination of whether an error is within an allowable range can be made even when ΔR is on the same order as the wavelength λ or even when ΔR is greater than the wavelength λ, a threshold value indicating an allowable range is set from the wavelength λ of a pulse signal and the amount of prescribed phase rotation of a phase factor. Specifically, as follows.

In the Embodiment 3, when a low-accuracy factor calculator 8 calculates a phase factor A' $(=\exp(4\pi jR'/\lambda))$ for an observation time t, the low-accuracy factor calculator 8 uses the following equation (11) to calculate $\exp(4\pi j\Delta R/\lambda)$ instead of the foregoing equation (5). In addition, the following equation (12) is used for obtaining a threshold value condition.

$$\exp\left(\frac{4\pi j\Delta R}{\lambda}\right) = \exp(j\beta) = \cos(\beta) + j\cdot\sin(\beta) \quad (11)$$

$$\cong \left(1 - \frac{1}{2}\beta^2\right) + j\cdot\left(\beta - \frac{1}{6}\beta^3\right)$$

$$\beta = 2\pi\left(\frac{2\Delta R}{\lambda} - \left[\frac{2\Delta R}{\lambda}\right]\right) \quad (12)$$

$$\beta < 2^{-6}$$

In the equation (12), [ ] denotes the Gaussian symbol and is a process of finding the largest integer that is less than or equal to the value inside of [ ].

Each α in the equation (5) indicates the phase of a sine or a cosine. When α=2π, the phases complete one cycle and thus a sine and a cosine have the same values as those for α=0. β is set to take into account this fact. The [ ] part is an integer part and thus β always takes a value greater than or equal to 0 and less than 2π.

Accordingly, even when ΔR which is a distance deviation is on the same order as the wavelength λ of a pulse signal or even when ΔR is greater than the wavelength λ of a pulse signal, depending on the value of β, a phase factor A' can be calculated by using the low-accuracy factor calculator 8.

In the above-described example, a threshold value is set every cycle of a phase. Alternatively, it is possible to set a threshold value condition by dividing phases of 2π.

In this case, when the low-accuracy factor calculator 8 calculates a phase factor A' $(=\exp(4\pi jR'/\lambda))$ for an observation time t, the low-accuracy factor calculator 8 uses the following equation (13), instead of the foregoing equation (5), to calculate $\exp(4\pi j\Delta R/\lambda)$. In addition, for a threshold value condition, the following equation (14) is used.

$$\exp\left(\frac{4\pi j\Delta R}{\lambda}\right) = \exp\left(j\left(\gamma + \frac{2\pi m}{K}\right)\right) \quad (13)$$

$$= \exp\left(j\frac{2\pi}{K}\right)^m (\cos(\gamma) + j\cdot\sin(\gamma))$$

$$\cong \left(1 - \frac{1}{2}\gamma^2\right) + j\cdot\left(\gamma - \frac{1}{6}\gamma^3\right)$$

$$\gamma = \frac{2\pi}{K}\left(\frac{2K\Delta R}{\pi} - m\right), m = \left[\frac{2K\Delta R}{\lambda}\right] \quad (14)$$

$$\gamma < 2^{-6}$$

Here, when K=1 is set, the equation (13) and the equation (14) become the same as the equation (11) and the equation (12). When K=2 is set, a threshold value condition determination is made every time the phase is rotated by π (by 180 degrees). In addition, when K=4 is set, a threshold value condition determination is made every time the phase is rotated by 90 degrees.

Although there is more possibility of the low-accuracy factor calculator 8 performing computations by increasing K, the equation (11) becomes complex. Therefore, it is desirable to set K depending on required computational accuracy.

In the Embodiment 3, it is configured to set a threshold value indicating an allowable range, from the wavelength λ of a pulse signal and the amount of prescribed phase rotation of a phase factor (the amount of rotation corresponding to the value of K). Therefore, even when ΔR which is a distance deviation is on the same order as the wavelength λ of a pulse signal or even when ΔR is greater than the wavelength λ of a pulse signal, a phase factor A' can be calculated by using the low-accuracy factor calculator 8.

Note that free combinations of the embodiments, or modifications to any component in the embodiments, or omissions of any component in the embodiments which fall within the spirit and scope of the invention may be made to the invention of the present application.

A synthetic aperture radar signal processing device according to the invention is suitable for one with a great need to reduce the amount of computation while ensuring sufficient computational accuracy of an image reconstruction process, when reconstructing a SAR image of the surface of the Earth, a sea surface, etc.

REFERENCE SIGNS LIST

1: a SAR sensor (a synthetic aperture radar), 2: a pulse compressor, 3: a received data storage, 4: a motion sensor, 5: a measurement data storage, 6: a determination processor (a determinator), 7: a high-accuracy factor calculator (a first calculator), 8: a low-accuracy factor calculator (a second calculator), 9: an intermediate data storage, 10: an image reconstruction processor (an image reconstructor), 11: a SAR image storage, 12: a controller, 51: a memory, and 52: a processor

The invention claimed is:

1. A synthetic aperture radar signal processing device for a synthetic aperture radar configured to acquire observation data, the synthetic aperture radar mounted on a moving platform having a motion sensor, a position of the moving platform being indicated in measurement data of the motion sensor, which measures motion of the moving platform, the synthetic aperture radar signal processing device comprising:
 a determinator configured to determine whether, based on the observation data obtained from the synthetic aperture radar, an error between a predicted position of the moving platform at an observation time of the synthetic aperture radar and a position of the moving platform at the observation time is within an allowable range;
 a first calculator configured to calculate by means of a first computation method having a first accuracy, when the determinator determines that the error is out of the allowable range, a distance from the moving platform to a pixel position in an observation target and a phase factor to be used for a backprojection process, the pixel position corresponding to the predicted position, said calculation being performed by using the predicted position at the observation time and the measurement data;
 a second calculator configured to calculate by means of a second computation method having a second accuracy less than the first accuracy, when the determinator determines that the error is within the allowable range, a distance from the moving platform to the pixel position and a phase factor to be used for a backprojection process, said calculation being performed by using the predicted position at the observation time and the measurement data, the second computation method being a computation method that uses an approximation algorithm, and the second computation method being different from the first computation method; and
 an image reconstructor configured to receive the observation data, including the position of the moving platform, from the synthetic aperture radar, and configured to reconstruct a synthetic aperture radar image by performing a backprojection process that uses the distance and the phase factor calculated by means of either the first computation method or the second computation method and also uses the observation data of the synthetic aperture radar obtained at the observation time.

2. The synthetic aperture radar signal processing device according to claim 1, wherein the determinator is configured to
 set a threshold value indicating the allowable range by using a wavelength of a pulse signal being radiated from the synthetic aperture radar toward the observation target,
 determine that the error is out of the allowable range when the error is greater than the threshold value, and
 determine that the error is within the allowable range when the error is less than or equal to the threshold value.

3. The synthetic aperture radar signal processing device according to claim 1, wherein the determinator is configured to
 set a threshold value indicating the allowable range by using a wavelength of a pulse signal radiated from the synthetic aperture radar toward the observation target and also using an amount of prescribed phase rotation of the phase factor,
 determine that the error is out of the allowable range when the error is greater than the threshold value, and
 determine that the error is within the allowable range when the error is less than or equal to the threshold value.

4. The synthetic aperture radar signal processing device according to claim 1, wherein one or more of the determinator, the first calculator, the second calculator, and the image reconstructor is composed of a semiconductor integrated circuit having a CPU mounted thereon or a one-chip microcomputer.

5. A non-transitory computer readable storage medium storing a synthetic aperture radar signal processing program which when executed by a computer causes the computer to execute a synthetic aperture radar signal process for a synthetic aperture radar configured to acquire observation data, the synthetic aperture radar mounted on a moving platform having a motion sensor, a position of the moving platform being indicated in measurement data of the motion sensor, which measures motion of the moving platform, said synthetic aperture radar signal process comprising:
 determining whether, based on the observation data obtained from the synthetic aperture radar, an error between a predicted position of the moving platform at an observation time of the synthetic aperture radar and a position of the moving platform at the observation time is within an allowable range;
 calculating by means of a first computation method having a first accuracy, when it is determined that the error is out of the allowable range, a distance from the moving platform to a pixel position in an observation target and a phase factor to be used for a backprojection process, the pixel position corresponding to the predicted position, said calculationbeing performed by using the predicted position at the observation time and the measurement data;
 calculating by means of a second computation method having a second accuracy less than the first accuracy, when it is determined that the error is within the allowable range, a distance from the moving platform to the pixel position and a phase factor to be used for a backprojection process, said calculation being performed by using the predicted position at the observation time and the measurement data, the second computation method being a computation method that uses an approximation algorithm, and the second computation method being different from the first computation method; and reconstructing a synthetic aperture radar image by receiving the observation data, including the position of the moving platform, from the synthetic aperture radar, and performing a backprojection process that uses the distance and the phase factor calculated by means of either the first computation method or the second computation method and also uses the observation data of the synthetic aperture radar obtained at the observation time.

6. A synthetic aperture radar signal processing method for a synthetic aperture radar configured to acquire observation data, the synthetic aperture radar mounted on a moving platform having a motion sensor and a processor, a position of the moving platform being indicated in measurement data of the motion sensor, which measures motion of the moving platform, the synthetic aperture radar signal processing method comprising:

determining, by the processor of the moving platform, whether, based on the observation data obtained from the synthetic aperture radar, an error between a predicted position of the moving platform at an observation time of the synthetic aperture radar and a position of the moving platform at the observation time is within an allowable range;

first calculating, by the processor of the mobile platform, by means of a first computation method having a first accuracy, when the determinator determines that the error is out of the allowable range, a distance from the moving platform to a pixel position in an observation target and a phase factor to be used for a backprojection process, the pixel position corresponding to the predicted position, said calculation being performed by using the predicted position at the observation time and the measurement data;

second calculating, by the processor of the mobile platform, by means of a second computation method having a second accuracy less than the first accuracy, when the determinator determines that the error is within the allowable range, a distance from the moving platform to the pixel position and a phase factor to be used for a backprojection process, said calculation being performed by using the predicted position at the observation time and the measurement data, the second computation method being a computation method that uses an approximation algorithm, and the second computation method being different from the first computation method; and reconstructing, by the processor of the mobile platform, a synthetic aperture radar image by receiving the observation data, including the position of the moving platform, from the synthetic aperture radar, and performing a backprojection process that uses the distance and the phase factor calculated by means of either the first computation method or the second computation method and also uses the observation data of the synthetic aperture radar obtained at the observation time.

* * * * *